March 21, 1939.    J. T. LOGAN ET AL    2,151,127
ELECTRICAL CONTROL
Filed Feb. 27, 1936    2 Sheets-Sheet 1

INVENTORS
James T. Logan, Robert J. Cooper,
Olan Richardson, Jake A. Benzyn

March 21, 1939.  J. T. LOGAN ET AL  2,151,127

ELECTRICAL CONTROL

Filed Feb. 27, 1936  2 Sheets-Sheet 2

INVENTORS
James T. Logan, Robert J. Cooper,
Jake V. Berlyn
Olen Richardson

Patented Mar. 21, 1939

2,151,127

UNITED STATES PATENT OFFICE 2,151,127

ELECTRICAL CONTROL

James T. Logan, Olan Richardson, and Robert J. Cooper, Atlanta, and Jake U. Benziger, Smyrna, Ga., assignors of one-third to Southern States Equipment Co., Birmingham, Ala.

Application February 27, 1936, Serial No. 66,020

9 Claims. (Cl. 290—40)

One purpose of the invention is to maintain a uniform frequency on the output of a high frequency oscillator; another purpose is to control accurately the speed of an electric power generator; another purpose is to control the output of a power generator; another purpose is to maintain a uniform frequency on the output of a power generator under varying loads and without unnecessary operations of the governing mechanism; another purpose is to control the division of load between two or more power generators operating in multiple; and other purposes will also be evident from the following description and claims.

Figures 1, 2, 4:
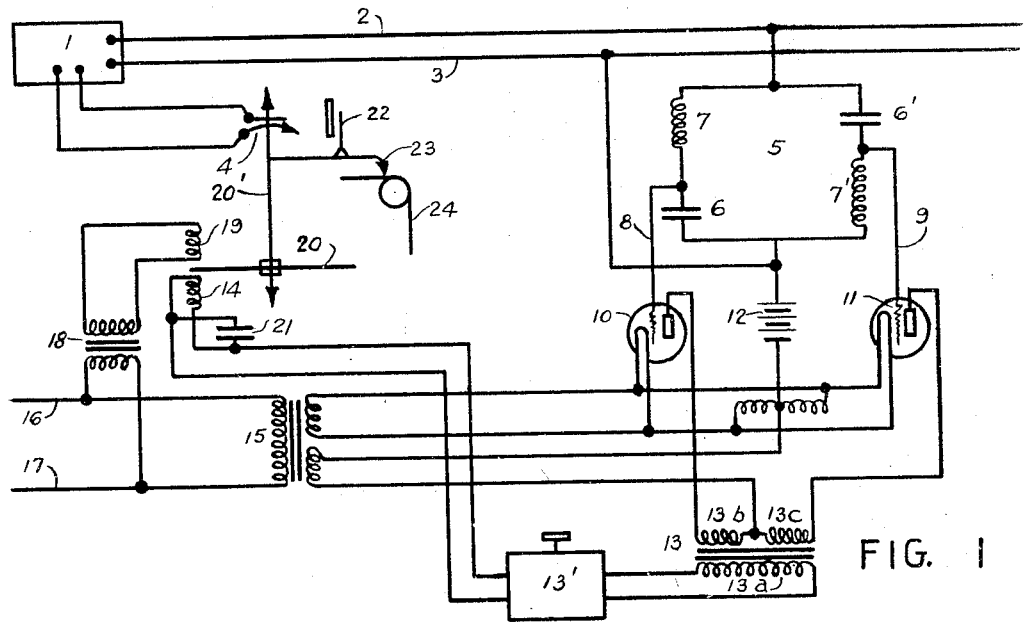
Figure 3:
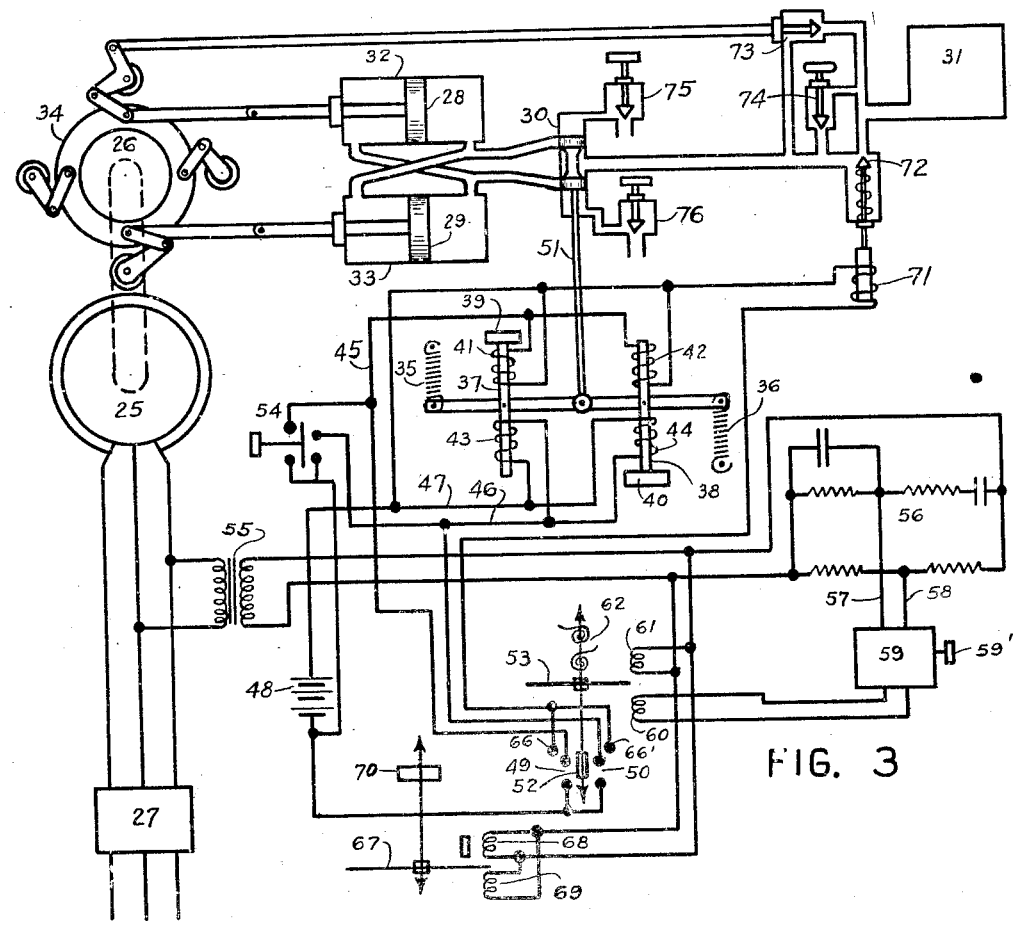
Figure 5:
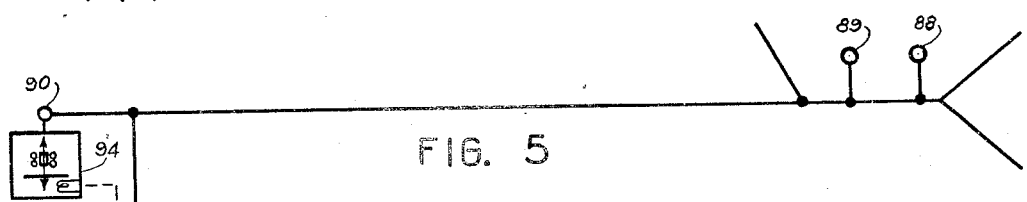
Figure 6:
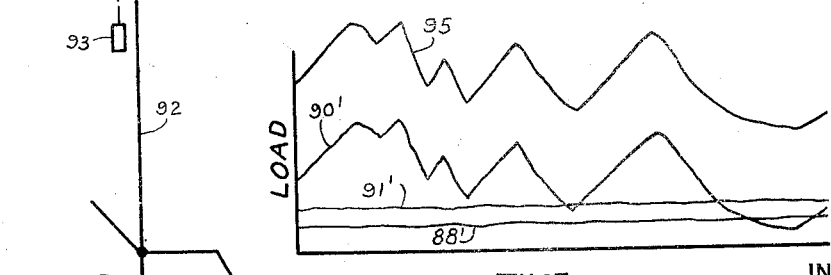

Referring to the drawings, Fig. 1 shows in diagram a high frequency oscillator with its output regulated by one design of our invention; Fig. 2 shows our invention when used to control the speed of a power generator; Fig. 3 shows another design in which the speed of a hydro-generator is regulated by equipment which includes our invention; Fig. 4 gives a large scale top view of movable contacts in Fig. 3; Fig. 5 shows a diagram of several generators on interconnected systems, operating in multiple, and controlled by our invention; Fig. 6 shows typical curves recording the output of each of several generators and also the total of all.

Referring to Fig. 1, 1 represents a high-frequency oscillator of any suitable type, the output being carried by the circuit 2, 3. The variable condenser 4 is so connected to the oscillator circuits that a change in the capacity of 4 changes the frequency of the output circuit 2, 3. Connected to the circuit 2, 3 is the network 5 which consists of two branch paths each with capacitors 6, 6' and reactors 7, 7' in the paths, respectively, as shown. Other combinations of resistors, reactors and capacitors may be used as alternatives if desired, without departing from the spirit and purpose of this invention.

The conductors 8, 9 connect the two mid-points of the network 5 to the grids of the electronic tubes 10, 11. A grid bias battery 12 is used to assure efficient operation of the tubes. The plate currents of tubes 10, 11 are applied to a three-winding transformer 13 in such a way that a resultant current is generated in 13a if grid potentials 8 and 9 become unbalanced or unequal. The current from 13a is amplified by the adjustable amplifier 13' and then is applied to a magnetic coil 14.

Transformer 15, excited from any convenient power source, as 16, 17, say at 110 volts, 60 cycles, supplies power through tubes 10, 11 for transformer 13. The net flux in the core of transformer 13 is zero when the measuring network 5 is balanced. Transformer 18 supplies a constant current to magnetic coil 19, say 5 amperes. The phase relation of flux in coils 14 and 19 is such as to produce rotation of the disc 20. Flux must be present, however, in both coils before rotation is produced. Coil 19 may be excited directly from the power source 16, 17 if desired, thereby eliminating transformer 18. A condenser 21 is connected across coil 14, and it is of such value as to give proper phase relation between the currents in coils 14 and 19. The shaft 20' to which the disc 20 is rigidly fastened operates the rotor plates of timing condenser 4, and also moves an indicator 22 and an inking pen 23.

The pen 23 rests upon a paper chart 24 which travels at a uniform rate, thereby making a continuous record chart.

Operation is as follows; and frequency values are used for illustrative purposes only.

Assume that oscillator 1 is designed to generate 100 kilocycles. The network 5 is adjusted so that potentials imposed from conductors 8 and 9 upon the grids of tubes 10 and 11 cause equal current to flow between filaments and their respective plates. These currents pass through coils 13b and 13c, and being equal and opposite, they produce no potential in coil 13a. Now assume that the output from oscillator 1 increases a few cycles. Network 5 becomes unbalanced, for the impedance of a capacitance decreases with increased frequency while the reverse is experienced in the case of a reactive circuit. The grid potential from 8 decreases due to lower ohmic value across 6 and higher ohmic value across 7; while the grid potential from 9 increases due to the greater ohmic value across 7' and the lower ohmic value across 6'. Therefore the plate current of 10 falls off while that of 11 increases, and so more current flows through 13c than flows through 13b. This generates potential in coil 13a, and current flows through coil 14 whose phase relation to that of current in coil 19 favors tube 11.

Disc 20 then rotates due to current in both coils 14 and 19. This rotation continues until the capacity of condenser 4 is changed sufficiently to restore the output of the oscillator 1 to 100 kilocycles, at which frequency the network 5 becomes balanced again and current in the coil 13a ceases to flow.

If the frequency of the oscillator 1 decreases, the voltage drop across the capacitor 6 increases and the drop across the reactor 7 decreases. Also the drop across 6' increases and the drop across $T'$ decreases. Therefore the tube 10 sends more current through the coil 13b than that which goes through the coil 13c from the tube 11. The current in the coil 13a is controlled by the coil 13b, and the potential applied to the coil 14 is shifted 180 degrees with respect to that in the coil 19.

This rotates the disc 20 in the opposite direction from that previously described for increased or above-normal frequency. The change on the condenser 4 is therefore in the direction to raise the frequency to the normal 100 kilocycles.

The network 5 can be made of resistors and capacitors, or it can be made of resistors and reactors. We have found, however, that the combined effect of capacitors and reactors gives the greatest sensitivity to changes in the applied frequency, since capacitors and reactors both respond to changes in frequency but in opposite directions. We have made equipment which gives an indication of 5 or 10 cycles out of 50 kilocycles.

Another application of the invention is shown in Fig. 3 where the speed, and therefore the frequency, of a power generator is controlled by means of our invention. It is assumed that the generator 25 is driven by the hydro-turbine 26, but any other type of prime mover may be used. The circuit breaker 27 connects the generator with the outgoing circuits. The gates of the turbine are opened and closed by movements of the hydraulic pistons 28, 29, and these pistons are controlled by the pilot valve 30. When the pilot valve is moved up, oil or other liquid from the pressure tank 31 is admitted to opposite ends of the two cylinders 32, 33, and simultaneously discharged from the other ends of the two cylinders; therefore the gate-collar 34 is rotated counterclockwise, closing the gates somewhat. When the pilot valve is moved down from its normal mid-position, oil is admitted to the other end of each of the cylinders 32, 33 and the gates are opened proportionately. When the pilot valve is at midposition it closes the supply and exhaust ports to both cylinders. The pilot valve is biased to the mid-position by two springs 35, 36 which hold the solenoid plungers 37, 38, against the stationary iron stops 39, 40.

The solenoids 41, 42, 43, 44 are connected as shown to the conductors 45, 46, 47 and to the battery 48. Solenoids 41, 42 are energized when the contacts 49 are closed; solenoids 43, 44 are energized when contacts 50 are closed.

When 41, 42 are energized, the plunger of 42 exerts a sudden upward thrust upon the rod 51 of the pilot-valve 30; and at the same time the plunger 37 is magnetized by the coil 41 and adheres to the magnetic stop 39. The rod 51 therefore makes only half the travel made by the plunger 42, and the stop 39 prevents erratic action. Similarly when solenoids 43, 44 are energized, the stop 40 holds the plunger 38 stationary. The springs 35, 36 exert only a relatively light pull and so they do not seriously affect the pull of the solenoids 43 and 42, respectively. Contacts 49 and 50 are closed by the member 52 which is attached to the shaft of the disc 53. A manual control switch 54 provides an alternate means to energize either the solenoids 41, 42 or the other pair 43, 44.

A potential transformer 55 supplies power to the network 56, which is made up of resistors and capacitors as shown, connected through conductors 57, 58 and amplifier 59 to the coil 60. This network is so proportioned that at normal frequency, say 60 cycles, there is no torque produced in disc 53 by coils 60 and 61. Any change from 60 cycles, however, will produce a potential change between 57 and 58, and this is amplified by the amplifier 59 and imposed on the magnetic coil 60. If the frequency is above 60 cycles the coil 60 will have a certain polarity as referred to the transformer 55; and if the frequency is below 60 cycles the polarity of 60 will be the reverse. The coil 61 is proportioned to carry a constant current, say 5 amperes, and the combined effect of coils 60 and 61 is to produce torque in the disc 53 in the well known manner. When the polarity of coil 60 is reversed, the direction of torque in the disc 53 is reversed. Springs 62 bias 52 and 53 to mid-position.

Referring to Fig. 4, the contactor 52 is insulated from the disc 53, by which it is flexibly supported. The two contact members 49 are held one above the other by the insulating arm 63 which is pivotally mounted at 64, and connected by link 65 to the disc-crank 70. The contact 66 is so located that at maximum travel the member 52 touches 66 as well as closing the contacts 49. Contacts 50 are similarly held by the insulating arm 63'; and similarly, at the end of its travel in the other direction, contactor 52 closes contacts 50 and also makes contact with 66'.

Induction disc 67 is caused to revolve slowly and steadily by the field of the two coils 68 and 69, and this rotates the disc 70 with its crank pin. As 70 revolves, the spring contacts 49 and 50 are continually approaching and receding from contactor 52 at intervals of a few seconds. When 70 is as shown in full lines, the contacts 50 are widely separated from contactor 52, which will have to travel its maximum before it closes contacts 50. When 70 has rotated 180° contacts 50 will be in the position shown by dotted lines, and a very small rotation of disc 53 will cause 52 to close 50. All contact members are flexibly supported on springs, and therefore when the disc 53 is rotated clockwise only slightly, the member 52 will close contacts 50 only for an instant as they approach and leave the dotted position. However, when 53 is subjected to considerable torque and the member 52 is moved over close to the full-line position of 50, then contacts 50 will be closed as soon as disc 70 starts to move 50 inwards; and the contacts will remain closed until the disc 70 has revolved almost 360°. In other words, the length of each interval during which contacts 50 remain closed, varies directly with the torque applied to the disc 53 by the coils 60 and 61. Also when there is great enough torque applied to 53, contacts 50 will remain continuously closed and 52 will also make contact with 66', until the torque on 53 is reduced. Under such conditions the spring supports of the various contacts allow the disc 70 to move the arm 63 in and out without rotation of disc 53 and without damage to any parts. When the torque on 53 is clockwise, contacts 49 and 66 are the ones which are similarly closed.

Whenever contacts 49 or 50 are closed, the pilot valve 30 admits and exhausts oil from the cylinders 32 and 33, thereby opening or closing the turbine gates, as required, in a series of movements. The greater the torque on 53, the longer will be the duration of each movement, and the greater will be the change in gate-position.

The parts are so proportioned and adjusted that at normal frequency of the generator 25, say 60 cycles, there is no torque developed by disc 53, and so no circuits are closed as 49 and 50 continually approach and recede from 52.

Whenever any unusual conditions, such as an increase of load, tend to slow down the generator, the frequency instantly changes from 60 cycles. This changes potentials in the network 56 in such a way as to cause a counter-clockwise rotation of disc 53. Thereby the contacts 50 are closed, the coils 43, 44 are energized and the pilot valve acts to open the turbine gates further. This increase of power brings the speed of the turbine up to normal again, and the network 56 is again brought to normal condition.

Conversely, a reduction of load with no changes in the gates of the turbine will tend to increase the speed of the generator, and the higher frequency will at once cause a partial closing of the turbine gates, thus reducing the frequency to the normal 60 cycles.

Under actual operating conditions the load on a power generator often fluctuates suddenly and widely, and to hold the generator speed steady at such times the prime mover must supply additional power with a minimum delay, and afterwards must decrease the supply of power just as quickly. On the other hand, if only a slight change of load occurs the prime mover must make only a slight change in the power it supplies to the generator; for if the supply of power is changed more than necessary, then the generator speed will be continually swinging above and below the normal speed. This is known as hunting.

The speed and amplitude of response to a change in frequency is determined by the torque on disc 53, and the amount of this torque for a given variation in frequency is dependent upon the amplifier 59. Therefore, by changing the control 59' on the amplifier, the sensitiveness of the entire control system can be increased or decreased at will.

Fly-ball governors and other mechanical devices for detecting speed variations do not respond to minute changes of speed. They are actuated by the differences between centrifugal force, inertia, momentum, gravity, and similar forces, and their every movement is delayed until the total of the forces developed is sufficient to overcome the friction and inertia which are always present when mechanical movement occurs. For these reasons the best mechanical detectors cannot respond at all to slight speed changes or changes in frequency which are ample to operate our electrical device, and mechanical devices always have a very sluggish action as compared with the instantaneous response of electrical circuits. The water gates, steam valves and other means used to govern the speed of prime movers, are of course mechanical. But by employing electrical speed detection and by using electrical control means as described, our invention provides a greatly improved means to govern electrical generators. Furthermore, motor-operated devices are slow compared with solenoid operated devices, for the rotor of a motor has far more inertia than the plunger of a solenoid. For some cases we may use electric motors, but for the quickest action we prefer solenoids.

A further advantage of this invention is that after each operation the pilot valve 30 is always instantly restored to normal position by the springs 35, 36, and since this closes both the inlet and exhaust ports of both cylinders, it locks the gates against further motion, until the next operation of the pilot valve. Thus the pilot valve is positively opened and then positively closed regardless of any observable motion of the piston 28, 29 or of the turbine gates.

It has been previous current practice to use a fly-ball device as speed detector, and open a pilot valve thereby; then the pilot valve acts through the cylinders to move the turbine gates, and motion of the gate mechanism is utilized to close the pilot valve and prevent further motion of the gates. This sequence necessarily leaves the pilot valve open until the turbine gates have made an appreciable motion, and until the speed again approaches normal. This results in over-travel of the turbine gates, causing too great a change in the speed of the turbine, and therefore the governor again operates to cause a reverse motion of the gates. Therefore the controls are constantly in motion, slightly opening and slightly closing the gates, above and below the exact position required by the load on the generator at that moment. This well-known beat of hydro-turbine governors is useful in keeping all parts of the governor mechanism in constant motion, thereby avoiding the greater friction which would develop if some of the moving parts should remain at rest in contact with one another.

By the use of the present invention, all turbo-generators, whether driven by steam or by water, can be held at uniform speed under varying loads, and without any beat or hunting effect.

The flow of oil from 31 to the pistons 32, 33 is controlled by the valves 72, 73 and 74.

Valve 73 is connected with the gate mechanism and becomes closed when gates are less than one quarter open. Valve 74 is manually adjustable, and when the turbine is running up to speed but with no load the turbine gates will be less than ¼ open, and therefore all oil for the pilot valve 30 has to pass through valve 74, which is adjusted to prevent over-travel of the gates under these conditions. Then when the generator is loaded and the gates of the turbine have opened to provide the needed additional power, valve 73 provides a freer flow of oil to 30, so that the gates can be moved more quickly.

When the generator is loaded and a fluctuation in load occurs so great that maximum torque is produced on 53, the member 52 energizes the contact 66 or 66'. The coil 71 is thereby energized and this opens valve 72, which allows an unrestricted flow of oil from the supply 31 to the pilot valve 30. As the torque on 53 decreases, coil 71 becomes de-energized and valve 72 is closed by its spring. Further changes in the gates will therefore be regulated again by valve 73.

Motion of the pistons 28 and 29 requires that oil be exhausted from one end of each cylinder as well as that it be admitted under pressure to the opposite ends of the cylinders. Valves 75, 76 are manually adjustable and they provide additional means to control the action of the equipment. For example, leaving the valve 76 fully open while valve 75 is partly closed will allow the gates to close with no restriction from valve 76, but the opening of the gates will be retarded by whatever added restriction is imposed by valve 75 upon the oil discharged through it.

All of these various control means give great flexibility of adjustment, so that the power supplied to the generator shall fluctuate as the load on the generator fluctuates, with no needless motions and with little or no hunting. And other results may also be accomplished by this accuracy of control.

A further modification of the invention is shown in Fig. 2 where the turbo-generator 77 is under control of the governing motor 78. The network 79 is fed from the transformer 80 and variations in frequency produce an unbalance in the 3-coil transformer 81. The flow of current in coil 81', acting through coil 82, and in conjunction with coil 83, produces a torque in the disc 84 and thereby closes either the contacts 85 or 86. These various parts function as do similar parts previously described.

The motor 78 is reversible and runs in one direction when coil 78—a is energized, and in a reverse direction when coil 78—b is energized. The battery 87 furnishes power to operate the motor 78.

The motor 78, therefore, runs in one direction when contacts 85 are closed, and in the reverse direction when contacts 86 are closed. This increases or decreases, respectively, the power developed by the prime mover, and so holds the frequency substantially uniform despite fluctuations of load imposed upon the generator. This control equipment is relatively simple, and it is suitable for certain classes of power generators.

Fig. 5 shows in one-line diagram several generators connected in multiple and all feeding into a group of interconnected systems. When controlled by this invention, the governor on each generating unit may be equivalent to that shown in Fig. 3 and it can be adjusted as desired. If it is desired that the unit 88 shall carry a uniform load while the unit 89 shall take up the load fluctuations at that portion of the system, then the governor of 88 is adjusted to give slow action, while the governor of 89 is adjusted for quick action. Generators 90 and 91 may be located one or two hundred miles away from generators 88 and 89, and proper adjustment of their governors will cause each one to take its desired portion of the load. All four units can be adjusted to take the fluctuations proportionately to the capacities of the units, or generators 88, 89 and 91 may be adjusted to carry relatively uniform loads while generator 90 takes up the fluctuations.

When several large systems are inter-connected it is most desirable to prevent hunting between the different systems, as this would result in overloading the transmission lines which tie the systems together. The desired balance between the systems can be obtained by accurately adjusting the sensitivity of each generator on all systems. By using controls such as are indicated in Fig. 3, each generator can be adjusted by means of the amplifier control 59'. Thus, if generator 90 absorbs load fluctuations which should be absorbed by generators 89 and 91, then the amplifier on 90 control is adjusted to give less amplification, and the amplifiers on 89 and on 91 are adjusted to give more amplification.

Let it be assumed that it is desired to have generator 90 absorb most of the load fluctuations on the system indicated in Fig. 5. Then all generators would have controls similar to Fig. 3.

Referring to Fig. 6, curve 88' may represent the output of each of generators 88 and 89, curve 91' shows the output of generator 91, while the large generator 90 has an output represented by curve 90'. This shows how the fluctuating total load on the systems which is shown by the curve 95, is divided between the various generators, the three small generators all carrying loads that are relatively uniform, while the fluctuations of load are absorbed by the large generator 90.

If it should be desired that a steady load be sent over the line 92 towards the system adjacent to 91, then a telemetering device may be installed at 93 and the indications may be transmitted to 94. Through suitable relays any variation from the desired load in the line 92 would operate the gates or steam-valves which control the generator at 90. Thus the generator 90 would act to maintain a uniform output through the line 92, instead of maintaining a uniform frequency in its output circuit. Under such circumstances the frequency control would be maintained by the other generators.

There are many other modifications which can be made without departing from the purpose and spirit of the invention, and we are not limited to the arrangements here shown and described.

We claim:

1. A frequency control system which includes an electrical generator, a governor to control the speed of the generator, a frequency responsive network energized in coordination with the frequency of the generated power, a transformer connected with the network and operable to change the polarity of its output circuit in coordination with variations of the generator frequency above and below its normal frequency, means controlled by the output circuit of the said transformer to control the said governor, and means to control the rate of response of the governor.

2. In combination in an electrical system, an alternating current generator, a prime mover for driving the generator, valve means for controlling the prime mover, a hydraulic relay including a pilot valve for operating the valve means, solenoids for operating the pilot valve, and frequency responsive equipment controlled by the frequency of the generated current for energizing the solenoids, and means to control the rate of response of the hydraulic relay to energization of the solenoids.

3. In combination in an electrical system, an alternating current generator, a prime mover for driving the generator, valve means for controlling the prime mover, a hydraulic relay including a pilot valve for operating the valve means, spring means for holding the pilot valve normally in neutral position, a solenoid operable to move the pilot valve and effect an opening movement of the valve means, a second solenoid operable to move the pilot valve to effect a closing movement of the valve means, means responsive to variations in frequency of the generated current to energize selectively said solenoids for operative movement, and means to vary selectively the rate of response of the hydraulic relay.

4. In combination in an electrical system, an alternating current generator, a prime mover for driving the generator, valve means for controlling the prime mover, a hydraulic relay including a pilot valve for operating the valve means, spring means for holding the pilot valve normally in neutral position, a solenoid operable to move the pilot valve and effect an opening movement of the valve means, a second solenoid operable to move the pilot valve to effect a closing movement of the valve means, means responsive to variations in frequency of the generated current to energize selectively said solenoids for operative movement, means to vary the period of energization of said solenoids responsive to the extent 2,151,127 of variation in said frequency, and means to vary the rate of response of the hydraulic relay selectively in both directions.

5. In combination in an electrical system, an alternating current generator, a prime mover for driving the generator, valve means for controlling the prime mover, a hydraulic relay including a pilot valve for operating the valve means, spring means for holding the pilot valve normally in neutral position, a solenoid operable to move the pilot valve and effect an opening movement of the valve means, a second solenoid operable to move the pilot valve to effect a closing movement of the valve means, means responsive to variations in frequency of the generated current to energize selectively said solenoids for operative movement, and means effective when one solenoid is energized for operative movement to hold the other against movement.

6. In an electrical system, an alternating current generator, a hydraulic turbine for driving the generator and control gates therefor, a hydraulic relay for operating the control gates, a fluid pressure supply for the relay, means responsive to a predetermined minimum control gate opening to restrict the supply of pressure fluid to the hydraulic relay and effective to increase said supply with a wider opening, a pilot valve for controlling the relay, a solenoid connected to the pilot valve to move it in one direction whereby the relay imparts an opening movement to the gates, a second solenoid connected to the pilot valve to move it in the opposite direction whereby the relay imparts a closing movement to the gates, spring means to move the pilot valve to neutral position, means responsive to variations in generator frequency to operate selectively the solenoids, and means to vary the rate of response of the hydraulic relay selectively in both directions.

7. In an electrical system, an alternating current generator, a hydraulic turbine for driving the generator and control gates therefor, a hydraulic relay for operating the control gates, a fluid pressure supply for the relay, means responsive to a predetermined minimum control gate opening to restrict the supply of pressure fluid to the hydraulic relay and effective to increase said supply with a wider opening, a pilot valve for controlling the relay, a solenoid connected to the pilot valve to move it in one direction whereby the relay imparts an opening movement to the gates, a second solenoid connected to the pilot valve to move it in the opposite direction whereby the relay imparts a closing movement to the gates, spring means to move the pilot valve to neutral position, means responsive to variations in generator frequency to operate selectively the solenoids, means to supply operating fluid to the hydraulic relay, and means responsive to the extent of opening of the valve means to control the volume of said fluid.

8. In an electrical system, an alternating current generator, a hydraulic turbine for driving the generator and control gates therefor, a hydraulic relay for operating the control gates, a fluid pressure supply for the relay, means responsive to extent of opening of the control gates to control the volume of pressure fluid supplied to the relay, a pilot valve for controlling the relay, and means responsive to variations in generator frequency for operating the pilot valve.

9. In an electrical system, an alternating current generator, a hydraulic turbine for driving the generator and control gates therefor, a hydraulic relay for operating the control gates, a fluid pressure supply for the relay, means responsive to extent of opening of the control gates to control the volume of pressure fluid supplied to the relay, a pilot valve for controlling the relay, means responsive to variations in generator frequency for operating the pilot valve, and means to control the rate of flow of fluid from the relay responsive to movements thereof.

JAMES T. LOGAN.
OLAN RICHARDSON.
ROBERT J. COOPER.
JAKE U. BENZIGER.